United States Patent [19]

Atkins et al.

[11] Patent Number: 4,772,090
[45] Date of Patent: Sep. 20, 1988

[54] FIBER OPTIC CABLE ARRANGEMENTS

[76] Inventors: Alan D. Atkins, 19, Biddel Springs, Highworth, Swindon Wiltshire, England, SN6 7BH; John S. T. Lomms, 13, Beauchamp Rd., East Molesey, Surrey; Robin J. T. Clabburn, Buckthorn House, Sevenhampton NR Swindon, both of England

[21] Appl. No.: 904,578

[22] Filed: Sep. 5, 1986

Related U.S. Application Data

[63] Continuation-in-part of Ser. No. 561,022, Dec. 13, 1983, abandoned, which is a continuation-in-part of Ser. No. 561,027, Dec. 13, 1983, abandoned, which is a continuation-in-part of Ser. No. 817,792, Jan. 9, 1986, abandoned, which is a continuation-in-part of Ser. No. 819,977, Jan. 13, 1986, abandoned.

[30] Foreign Application Priority Data

Dec. 13, 1982 [GB] United Kingdom ................. 8235441
Apr. 22, 1983 [GB] United Kingdom ................. 8311048

[51] Int. Cl.⁴ .............................................. G02B 6/44
[52] U.S. Cl. .............................. 350/96.23; 174/40 R; 174/73.1; 350/96.20
[58] Field of Search ................... 174/40 R, 73 R; 350/96.20, 96.23

[56] References Cited

U.S. PATENT DOCUMENTS

| 3,746,424 | 7/1973 | Hermstein | 350/96.23 |
| 4,409,428 | 10/1983 | Dey et al. | 174/139 X |
| 4,610,033 | 9/1986 | Fox, Jr. | 350/96.23 X |
| 4,717,237 | 1/1988 | Austin | 350/96.23 |

FOREIGN PATENT DOCUMENTS

58-162911  9/1983  Japan .................. 350/96.23

Primary Examiner—John Lee
Attorney, Agent, or Firm—Kinney & Lange

[57] ABSTRACT

A fibre optic cable is helically wound on to an overhead high voltage conductor, and has an electrically non-tracking outer jacket and is filled with protective material, or has a conductive outer jacket. The cable is guided off the conductor inside a conductive housing, and then to earth potential along the inside of a non-tracking shedded or convoluted tube.

4 Claims, 9 Drawing Sheets

FIBER OPTIC CABLE ARRANGEMENTS

The present application is a continuation-in-part of U.S. application Ser. Nos. 561,022, filed Dec. 13, 1983, 561,027, filed Dec. 13, 1983, 817,792, filed Jan. 9, 1986, and 819,977, filed Jan. 13, 1986, all abandoned, the disclosures of which are all incorporated herein by reference.

This invention relates to fibre optic cables, and in particular to fibre optic cable suitable for installation closely adjacent to, or in physical contact with high voltage equipment such as a high voltage conductor, and also to arrangements including fibre optic cables.

By high voltage equipment is meant equipment, for example, a conductor rated at 1 kV or above, and may be for example a 33 kV or 400 kV power conductor.

The use of a fibre optic cable in association with a high voltage conductor is known from UK Patent Application Publication Nos. 2083647A and 2101351A. These publications disclose arrangements in which a fibre optic cable extends inside a high voltage conductor and thus is not subject to its electric field gradient. The arrangements provide for the cable to leave the conductor in a metal housing and to extend through a porcelain chamber filled with insulating oil to a location at earth potential. An article in Distribution Developments (September, 1982) discloses the mounting of a fibre optic cable having an outer sheath manufactured from a non-tracking low erosion compound on an overhead conductor.

The present invention provides a fibre optic cable or cable arrangement whereby the cable may be used in close proximity to, and subject to the electric field of, high voltage equipment, for example high voltage conductors, switchgear, transformers, motors and generators, and whereby the cable may be routed through or around equipment at different potentials, including earth potential, without adversely affecting the operation of the cable.

The fibre cable may transmit optically encoded data such data may be in either digital or analogue form, and such data may be used for the monitoring and control of an electrical network of which the conductor, for example, forms part. However, the cable may be employed for the transmission of data not relevant to the operation of the network, such data including telecommunications and similar signals normally carried by fibre optic links. Furthermore, it is envisaged that the fibre optic cable could itself serve as a sensor to monitor the operating parameters of an electrical system, including those of the conductor.

In accordance with one aspect of the present invention, there is provided an arrangement comprising a high voltage conductor, which may be uninsulated, and a fibre optic cable adjacent to or in contact with the conductor, the cable having an outer, electrically protective jacket. Advantageously, the jacket is of a substantially electrically non-tracking material, and may be electrically insulating, substantially, non-wetting and weather resistant.

Thus, if such a jacket, or coating, is applied to the fibre optic cable throughout its length, the cable may be applied to the surface of a conductor that is energised. For this latter application to be successful, that is to say for the arrangement to be such that integrity of the cable, and thus the transmitted optical signal, remains intact, the coating must be sufficiently robust to resist electrical activity resulting from the electrical field surrounding the conductor. Three formidable problems must be overcome before the arrangement can be expected to provide acceptable long term performance. These problems include: stress control at the point where the fibre optic cable leaves the high voltage conductor and where it approaches ground, or earth, potential; control of surface leakage currents which will flow along the surface of the fibre optic cable sheath as a result of contamination; and the maintenance of the integrity of the fibre optic cable after prolonged outdoor exposure to high electric stress. Problems of these general kinds are shown within the electricity distribution industry, and in many instances typical devices including insulators, cable terminations and the like, which must of necessity encompass phase and ground potential, have been designed with these problems in mind.

However, solutions appropriate to insulators or high voltage power cables are not appropriate to fibre optic cables.

Stress control in high voltage cable terminations can be effected either resistively or capacitively by coupling with the energised centre conductor of the cable. A fibre optic cable, however, has no such conductor and in some respects can be considered to be more similar to a high voltage insulator. A high voltage insulator is designed to control surface leakage currents by the provision of sheds on its surface. The sheds have several functions: increasing the creepage distance, often to more than three times the actual phase-toground distance; provision of numerous "dry" areas of relatively high resistance, which can maintain the leakage currents at acceptably low levels; and the provision of protected areas which limit the deposition of pollutants.

By comparison, the diameter of a fibre optic cable is typically one tenth to one hundredth that of a high voltage insulator and the fibre optic cable was negligible strength. The provision of shedded areas to produce the same result as in typical high voltage insulators is clearly impractical and other solutions must therefore be sought to both problems.

Insulators are of solid core or occasionally oil filled construction to eliminate, or at least to reduce, internal dischage activity which might result in failure. By comparison optical fibres are frequently of "loose tube" construction, or laid up in such a way as to form extended internal voids. Since air is a good dielectric material it might be supposed that such voids in so small a structure would have negligible affect. However, experience and experiment have shown that such voids are detrimental to longer term service life and must either be eliminated or their potentially detrimental effects curtailed in some other way.

It is one object of the present invention to prevent, or at least to reduce, damage to a fibre optic cable that is to be located in the vicinity of a high voltage conductor, including the region where the cable leaves the conductor, and that accordingly is subject to flow of leakage current therealong.

It is another object of the invention to minimise other detrimental effects of leakage current or induced current, such as radiated interference and spurious optical signals.

Accordingly, in another aspect the invention provides a fibre optic cable that is constructed so as to be suitable for use at high voltages, for example by being installed adjacent to or in contact with a high voltage conductor. Conveniently, the cable may be helically wound around the conductor, which may be an overhead line conductor. Such a construction, however, also permits the fibre optic cable to be used in close proximity to other high voltage equipment, for example switchgear or transformers.

The fibre optic cable of the invention may be of any suitable configuration, and may, for example, comprise one or more optic fibres, each within its individual sheath or sheaths, and where more than one fibre is present, these may be grouped together within a single outer sheath.

In accordance with said another aspect of the invention, two configurations of high voltage fibre optic cable are proposed which may be used separately or in conjunction with one another. It is envisaged that the fibre optic cable may have other components, in addition to those specifically mentioned.

The first configuration of fibre optic cable in accordance with the invention comprises a substantially non-tracking outer jacket, a non metallic strength member, one or more fibre optic elements and a compatible, protective filler.

The filler is arranged substantially to eliminate, or at least inhibit, the formation or existence of significant elongate voids, or the significant transmission of moisture within the structure in the event of puncture of said outer protective jacket. The same filler may be used to achieve each of these results, or separate fillers may be required.

The compatible filler may be incorporated into the construction during manufacture, and may comprise a similar material to the jacket; a gum-like material, for example based on silicone, butyl, or ethylene propylene elastomers; a wax or jelly-like material for example a petroleum jelly; or an oil which may be incorporated during manufacture or subsequently drawn into the interstices of the construction. The filler may be of the same material as, and integral with, the cable jacket, such that filling of the cable, for example by complete impregnation of a braided component thereof, is effected when the jacket is added during manufacture.

The jacket and filler may be subsequently cross-linked by high energy radiation or chemical means.

The second configuration of high voltage fibre optic cable in accordance with the invention comprises a conductive outer jacket, which may be of metal or polymer, a strength member and one or more fibre optic elements.

A fibre optic cable of said first configuration may be installed adjacent to or in contact with a high voltage conductor, and may pass from the high voltage conductor to ground. A cable of the second configuration is particularly suited to operation at a single potential and may be connected to a cable of the first configuration to effect a transition between high voltage and ground potential.

However, the more straightforward construction, and the conductive outer sheath of the second configuration cable make it particularly, though not exclusively, suited to installation adjacent to a live conductor at high voltages whereas the first configuration cable is particularly though not exclusively, suited to the transition from high voltage to ground potential.

It will be appreciated that the material of the outer jacket of the fibre optic cable of the invention would be selected in dependence on the electrical environment in which it is located. For a cable subject to a high voltage field, for example by being wound on an uninsulated overhead power conductor, a conductive outer jacket of a material having a resistance of less than about $10^6$ ohms per cm of its length would be suitable. Such a material ensures in general, that the potential of the cable jacket is sufficiently close to that of the conductor so that any surface discharge activity that may take place on the cable will be insufficient to cause any damage thereto. However, if such a jacket were insulating, having a resistance of more than about $10^7$ or $10^8$ ohms per cm length, then it should either be encased in a further jacket of a non-tracking insulating material, or made entirely from such non-tracking insulating material. Thus, even though there may be an appreciable difference in potential between the conductor and the cable, the cable jacket has a protective outer surface. Where the fibre optic cable is required to extend between phase potential and ground potential, the outer jacket should have a resistance of at least about $10^7$ or $10^8$ ohms per cm length and be non-tracking. If the resistance of the outer jacket of such a cable were of significantly lower potential, then the leakage current flowing therealong, and the power dissipation, could be unacceptably high. Thus, it will be understood that at higher voltages electrical tracking along the cable surface has to be minimised, whilst at lower voltages the leakage current has to be maintained within an acceptable limit. The particular resistance limits will, accordingly, be dependant on the operating voltage to which the cable is subject.

Although usually it will be desirable to provide filling for the fibre optic only when an insulating outer covering is provided, it may in some circumstances be advantageous to fill the cable when it has a conductive outer covering. For example, the fibre optic cable may be provided with a non-tracking jacket and be disposed within a metal tube. Such a tube would enhance the mechanical protection and moisture proofing of the cable. However, on splicing or terminating such a cable, the metal tube would be removed at the cable end and thus subject the cable to axial ingress of moisture. In such circumstances, water blocking of the cable would be advantageous. Filling or blocking the cable is particularly important where the cable extends between locations at appreciably different voltages, for example from a conductor at phase voltage to ground potential. However, ingress of moisture at any part of the cable may cause long term damage to its optical properties, if water comes into contact with the glass fibre, for example.

In another configuration of fibre optic cable in accordance with the invention, only part of the cable has an electrically-conductive outer jacket, said part being arranged, in use, to be in contact with the high voltage equipment, such as a power conductor.

In accordance with a further aspect of the present invention, there is provided a fibre optic cable suitable for extending between a region of high electric potential and a region of appreciably lower potential, wherein in the high potential region the cable has an outer jacket of electrically conductive material, and wherein in the lower potential region the cable has an outer jacket of substantially electrically non-tracking material.

The lower potential may be earth potential.

The non-tracking outer jacket material used in the lower potential, and preferably also in the transition region from the high potential region, may be a replacement for said conductive outer jacket material, or alternatively may be provided as a further layer thereover.

The present invention further provides a fibre optic cable that is suitable for use at high voltages, where it is subject to high electric stress and which may be mounted, for example, adjacent to or in contact with a high voltage conductor, and that may be connected to earth potential at one or each of its ends.

The invention also provides a fibre optic cable having stress control means associated therewith.

The invention further provides means for terminating a fibre optic cable, which cable is to be used at high voltages, wherein at least one of the ends of the cable is environmentally protected, for example against atmospheric pollution.

The cable may be located in a tubular member, and may but and need not be environmentally sealed. For example a protective housing for the tube may be perforated, so as to avoid the build-up of moisture for example.

The invention also provides means for terminating a fibre optic cable, which cable is to be used at high voltages, wherein at least one of the ends of the cable is arranged so as to minimise or at least reduce adverse effects of flow of leakage current therealong.

Accordingly, the invention provides an assembly comprising high voltage equipment, a fibre optic cable that in use is for location so as to be subject to the electric field of the equipment, and electrically conductive means for mounting on the cable so as to conduct to a point at each potential any leakage current flowing along the cable jacket.

The high voltage equipment may be a high voltage electrical conductor.

The means for conducting leakage current to earth, which may be an earth leakage current collector or a means for reducing the leakage current density, may conveniently comprise two electrically-conducting half-shells clamped directly on to the cable. When the cable is itself enclosed within an enviromentally-protecting member, as hereinafter described, the earth leakage current collector may further comprise means, similar to the said electrically conductive means, for connecting such member to earth and thus for earthing any leakage current flowing therealong.

Such earthing means may be used in combination with fibre optic cables and other assemblies in accordance with the present invention.

The earth leakage current collector may alternatively be provided by a hybrid arrangement comprising a pair of insulating, for example porcelain, half shells that are mounted on the cable and that abut a pair of metal earthing half-shells that are mounted on the cable in the direction of the lower potential from the insulating half shells. Such an arrangement is disclosed and claimed in British Patent Application No. 8312892, the contents of which are included herein by this reference.

In accordance with another aspect of the present invention, there is provided an assembly comprising high voltage equipment, for example, a high voltage conductor, a fibre optic cable that, in use, is located externally of the equipment so as to be subject to the electric field thereof, and electrical stress control means, wherein any electrical stress, arising from the electric field produced by the conductor, to which the cable is subjected, is substantially insufficient to cause damage to the fibre optic cable, for example by puncturing that allows water ingress, or other adverse effects such as radiated interference, or spurious optical signals.

In accordance with another aspect of the invention, there is provided a method of providing electrical protection for a fibre optic cable that is located externally of electrical equipment so as to be subject to the electric field thereof, wherein the cable is provided with electrical stress control means such that any electrical stress, arising from the electric field produced by the equipment, to which the cable is subjected, is substantially insufficient to cause damage to the fibre optic cable, or other adverse effects as mentioned above.

The cable may extend along or alongside, and preferably be helically wrapped around, the conductor.

The invention thus allows a fibre optic cable to be mounted exterally of a high voltage conductor, for example, and to be removed therefrom, or to provide for splicing thereto, at any position along the length of the conductor, and to be brought safely to a location of appreciably different electrical potential, without having to terminate, splice, or otherwise interfere with the conductor itself.

The invention also allows a fibre optic cable to extend safely from a sensor associated with high voltage electrical equipment to a much lower, for example earth, potential.

The stress control means may be arranged to enclose the fibre optic cable in the region where the cable leaves the immediate vicinity of the field of the conductor.

Preferably, the electrical stress control means comprises an electrically-conductive housing, of conductive polymeric material, or metal, for example, that is mounted on the equipment, and the cable is arranged to leave the equipment and pass towards a site of significantly different electrical potential, eg earth potential, through the appreciably-reduced field environment of the housing.

The housing may thus provide an enclosure that is substantially free from the electric field associated with the high voltage conductor, so that the fibre optic cable, which is initially at the voltage of the conductor along which it may, in use, extend, can leave the conductor in the vicinity of the housing and can safely be lead away from the high voltage conductor to, or at least towards, a position at a much lower potential. Thus, the housing need extend away from the conductor only so far as to ensure that when the fibre optic cable exits therefrom into any electric field of the conductor, the field strength is too small to effect any substantial damage of the cable or have such adverse effects as discussed above. To this end, the configuration of the housing may be such as to reduce the effect of the electric stress from the field of the conductor. Advantageously the cable exit of the housing may open outwards away from the conductor, being conical or bell-shape for example. It will be appreciated that the configuration, including the shaping and size, of the housing may be different for high voltage conductors of different voltage ratings, so as to optimise the electrical protection of the fibre optic cable. It will be understood that the function of the housing is to act in a manner similar to that of a Faraday Cage, and thus it need not completely physically enclose the fibre optic cable. Furthermore, the housing will not, in general, be required to carry any appreciable electric current. To these ends, the stress control effect may be achieved by a partially open configuration, for example a lattice work wrapping of electrically conductive material around the region where the fibre optic cable leaves the immediate vicinity of the electric field of the high voltage conductor.

It is further envisaged that an electrically-conductive housing may be arranged to protect the cable at the location where the cable is brought to earth potential.

Preferably the housing has a passage therethrough and an inlet and an outlet spaced from but in communication with the passage, whereby the high voltage conductor extends through the passage, and supports the housing, and the fibre optic cable is arranged to leave the conductor just outside the housing, to enter through the inlet and to exit from the housing through said outlet. It will be appreciated that the fibre optic cable should leave the conductor, and thus enter the housing, at a position close enough to the housing such that no significant potential drop exists along the fibre optic cable. Preferably, the fibre optic cable should not extend laterally of the high voltage conductor for more than about three times the diameter of the conductor before entering the conductive housing.

Alternatively, the fibre optic cable may enter the housing into the passage together with the conductor, and thus leave the conductor within the housing itself. The housing may comprise two half shells that are secured together, by screws for example, so as to allow the conductor to pass therethrough and so as to extend transversely thereof, preferably flaring outwardly, to guide the fibre optic cable away from the conductor.

The housing may be split at one end, for example by being bifurcated, so that it can be pushed on to the conductor, and may be provided with a closure cap, as a screw fit, push fit or snap-on for example. Alternatively, or in addition, the housing may be a two-part housing with a suitable closure mechanism, or be of a one-part wraparound configuration. The housing may be substantially elongate, or may have some other shape, for example a T-shape whereby the arms of the T extend along the conductor.

In one configuration, the housing is generally elongate, having bifurcations at one end leading to a transverse passage receiving the conductor, with an outlet at the other end of the housing leading the fibre optic cable away from the conductor.

Preferably the housing is environmentally sealed on to the high voltage conductor, advantageously by means of electrically conducting mastic or sealant.

Environmental protection, for example from water or salt or other pollutants, of the fibre optic cable after leaving the housing may be provided by an electrically-insulating, non-tracking preferably tubular, member that interengages with the housing and leads the cable away therefrom, advantageously all the way to the earthed location. This member may be convoluted and/or shedded on its outer surface.

U.S. Pat. No. 3,746,424 discloses an isolating device for guiding an optical fibre bundle from a current measuring device associated with a high voltage conductor to a detection device at earth potential, in which the isolating device has a plurality of skirts along its length. However, there is no provision for, for example, the fibre optic bundle to extend externally of the conductor so as to be subject to its electric field.

Further protection of the optical fibre may be achieved by completely filling the region between the cable and the enclosing housing and/or insulating member. One way of achieving this is to arrange for the insulating member to be shrinkable, for example heat-shrinkable, on to the optical cable, preferably with an internal sealant or adhesive coating, for example a mastic or a hot melt adhesive. Another way is to ensure that the region between the optical cable and the insulating member is filled with an oil, resin, foam, or other suitable insulating medium. With such provision, the sealing of the housing on to the conductor is not so important, and may be dispensed with entirely.

In an alternative configuration of the assembly of the invention, the or a further stress control means may be located at a position where the cable, initially subject to a high voltage, approaches or reaches a much lower, for example earth, potential. Such stress control means may act as an earth leakage current collector and thus ensure safe earthing of the cable without casing any appreciable electrical damage thereto or minimise other adverse effects of the leakage current.

The invention also provides a method of applying stress control to a fibre optic cable that has left the immediate vicinity of the electric field of a high voltage conductor and is brought to an appreciably lower, for example earth, potential.

It will be appreciated that depending on the operating conditons, the invention may provide an assembly that comprises any two or all three of the above-mentioned features, namely said electrical stress control means for minimising any electrical stress to which the fibre optic cable is subjected, means for earthing any leakage current flowing along the cable, and environmental protection means for the cable as it passes from a location at one potential to a location at an appreciably different potential, for example from high voltage to earth.

One advantageous arrangement of the invention comprises a fibre optic cable associated with a high voltage conductor, which may be an overhead conductor, stress control means arranged such that substantially no electrical damage is caused to the cable where it leaves the conductor, a protective tubular member for guiding the cable towards a region of significantly lower electrical potential, for example earth, and further stress control means for electrically terminating the cable without electrical damage at said lower potential.

The tubular member of the invention extending from the high voltage region may have a convoluted and/or shedded outer surface, for extending the creepage path length. Its inner surface may be convoluted. The tubular member may be insulating, non-tracking and weather resistant, and may be filled to prevent water deposition therealong.

It is to be understood that the arrangements of the invention may include the fibre optic cables of the invention as appropriate, and that the assemblies of the invention may likewise include the arrangements or fibre optic cables of the invention.

A method of providing electrical protection for a fibre optic cable that is associated with a high voltage conductor, and an assembly comprising the cable, conductor and an electrically-conductive housing, each in accordance with the present invention, will now be described, by way of example, with reference to the accompanying drawings in which:

Figures 1, 1A:
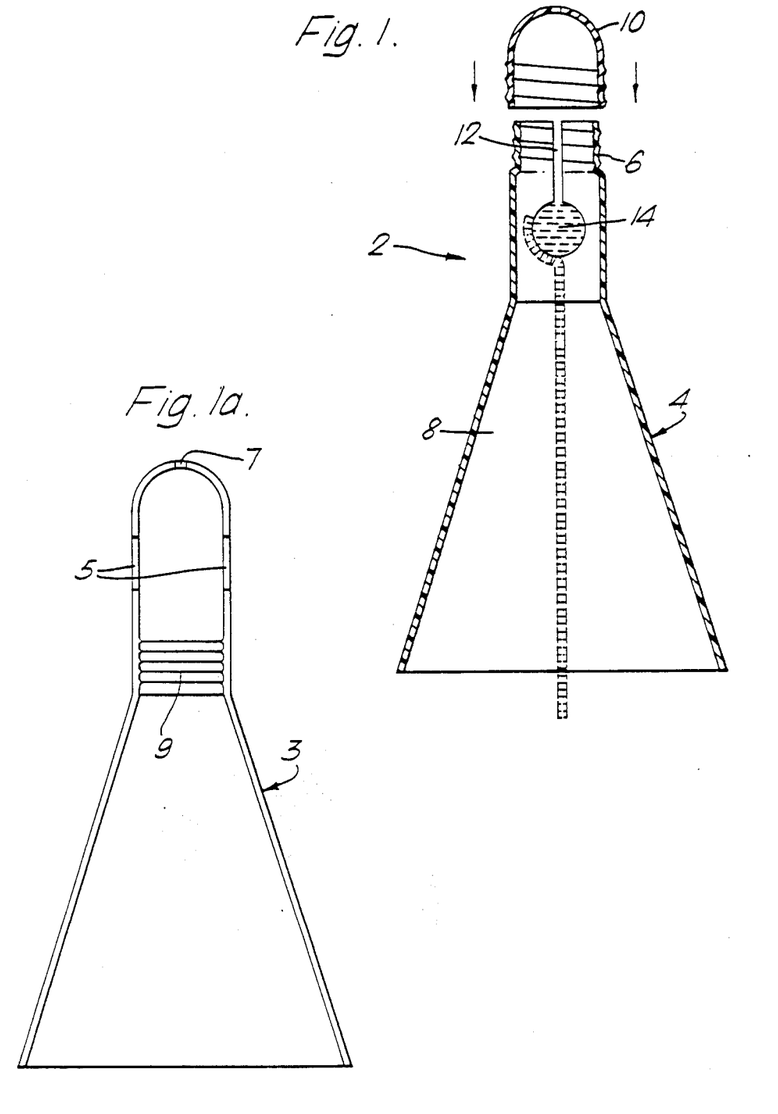
FIG. 1 is a sectional elevation of the housing.
FIG. 1a is a sectional elevation of half of another embodiment of the housing.

Referring to FIG. 1, a housing 2 is made from an electrically-conductive polymeric material, and provides electrical protection for a fibre optic cable that extends along a high voltage conductor. The conductor and cable are shown in outline in FIG. 1, and will be described in more detail with reference to FIG. 2. The housing 2 comprises a first elongate part 4 that is open at each end and that has an upper generally right cylindrical portion 6 that continues downwards into a generally conical portion 8. The housing 2 has a second part 10, that provides a closure cap for the housing portion 6, and for this purpose the closure cap 10 has an internal thread and the cylindrical portion 6 has a mating external thread.

The cylindrical portion 6 is bifurcated at its open end so that a slit 12 therein extends from the open end to generally circular openings in opposing side walls of the portion 6 that define a generally tubular passageway 14 therethrough.

Figure 2:
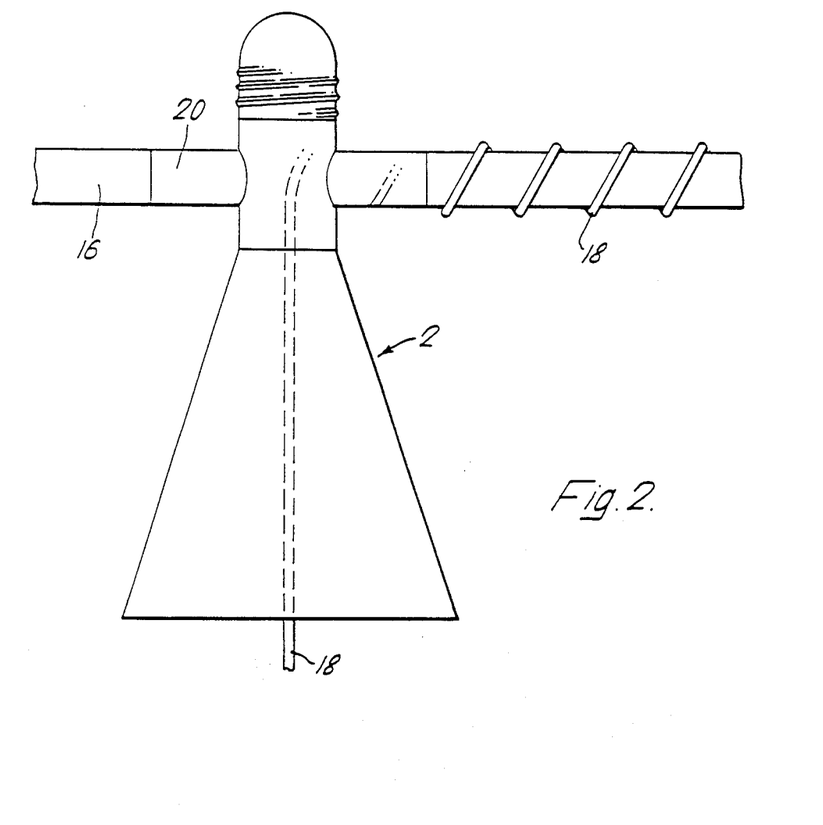
FIG. 2 is a side elevation of one embodiment of the assembly, including the housing of FIG. 1.

FIG. 2 shows the housing 2 of FIG. 1 mounted on a high voltage uninsulated overhead conductor 16 that has a fibre optic cable 18 wound helically therearound. The cable 18 may have any suitable construction as hereinbefore described. The bifurcated cylindrical portion 6 of the housing 2 is spread apart so as to enlarge the slit 12 to an extent that the conductor 16 can pass therealong so as to be located within the housing passageway 14. The fibre optic cable 18 extends with the conductor 16 into the passageway 14, but within the housing 2 is lead off the conductor 16 and down through the open end of the conical housing portion 8. A conductive mastic material 20 is wrapped around the cable carrying conductor 16 where it extends into, through, and out of the housing 2 to prevent ingress of moisture into the housing along the passageway 14. The slit 12 is closed, and the housing cap 10 screwed on to the cylindrical portion 6, thereby sealing the top of the housing 2. FIG. 1a shows one half 3 of a cast metal housing, that is secured to a corresponding half shell by screws or bolts so as to enclose the high voltage conductor. The housing formed from the half shells 3 functions electrically in the same way as the housing 2 of FIG. 1, but each half shell extends integrally above and below the conductor, one on each side thereof. Thus, the conductor extends through a channel 5, the fibre optic cable enters through aperture 7, and internal ribs 9 provide for securing of a protective tube (not shown) for guiding the fibre opric cable transversely away from the conductor.

Figure 2A:
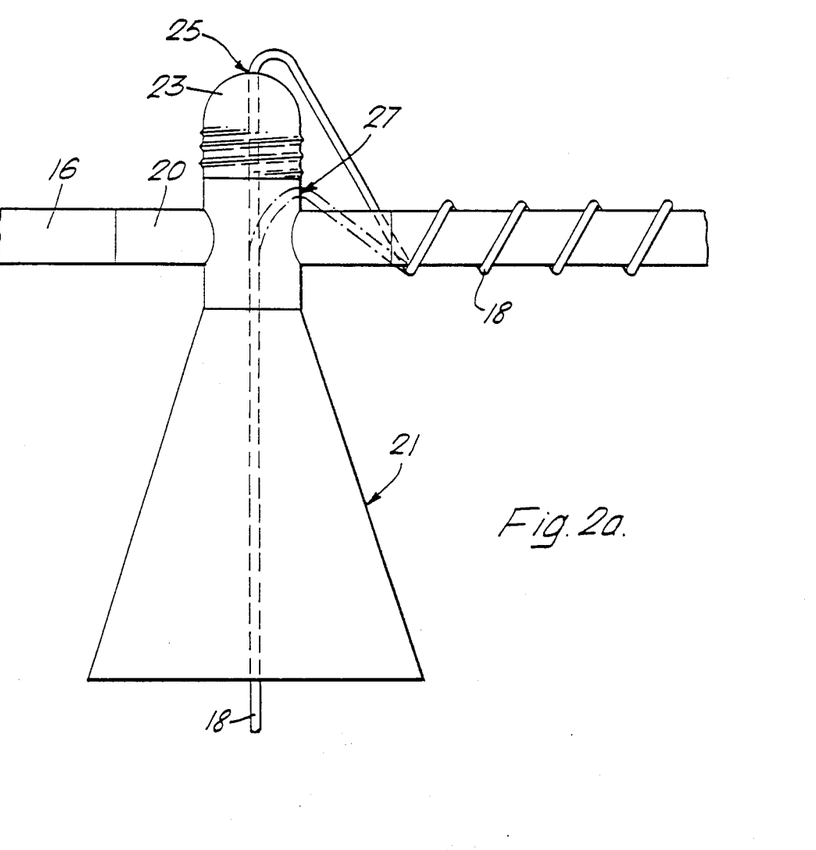
FIGS. 2a, 3 and 4 are side elevations of other embodiments of the assembly.

Referring to FIG. 2a, the assembly has a housing 21 that differs from the housing 2 in its provision for entry of the fibre optic cable 18. In this arrangement, the cable 18 passes away from the conductor 16 at a distance of about 50 mm before the conductor enters the housing. The cable 18 then extends up to the housing cap 23 that has an aperture 25 that allows the cable to pass down into the housing 21. In another alternative configuration, an inlet aperture 27 for the optical cable 18 is on the side of the cap, and the path of the cable 18 is then as shwon by the broken lines in FIG. 2a. Since the cable 18 enters the housing 21 through aperture 25, or 27, rather than entering along the conductor 16, as shown in FIG. 2, there will be no chafing between the fibre optic cable 18, conductor 16 and the housing passage entrance. Furthermore, since the cable 18 is only away from the conductor 16 for a short distance before entering the conductive housing, no appreciable electrical stress is applied to the cable.

The configuration of the housings 2 and 21 is such that in the region where the fibre optic cable 18 extends out from the conical portion 8 thereof, the electric stress on the cable arising from the field associated with the conductor 16 is insufficient to cause damage to the cable or other adverse effects. To this end, parameters such as the length of the housing 2 and the angle of the conical portion 8 are selected in accordance with the voltage rating of the conductor 16. For a 33 kV conductor, for example, the length of the housing extending therebelow is typically 5 cm to 8 cm, with the conical surface of the housing making an angle of approximately 10° with the vertical (as seen in the Figures).

Figure 3:
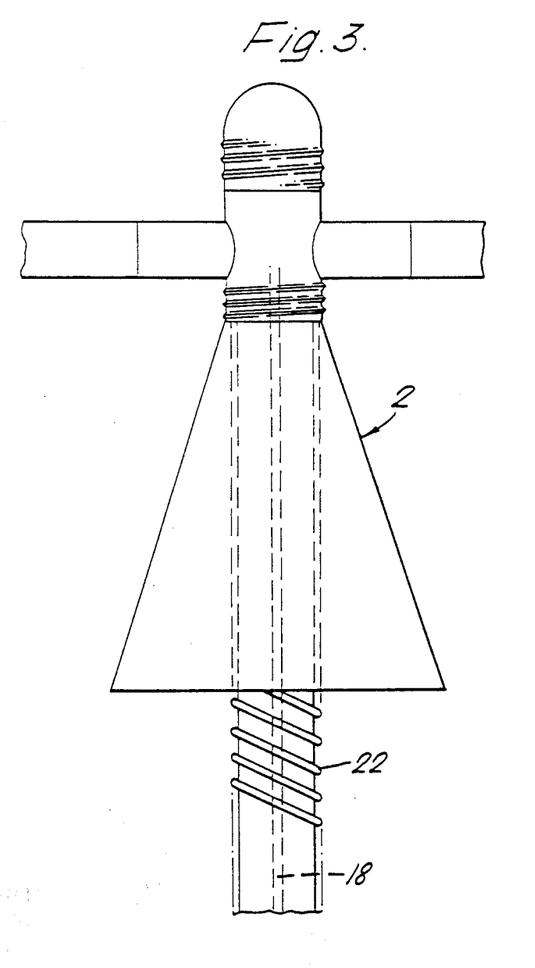

In the modified assembly shown in FIG. 3, further, mechanical, protection of the fibre optic cable 18 is provided on leaving the housing by enclosing it within a convoluted tube 22 of electrically insulatng polymeric material. Tube 22 engages internally with a threaded section 23 of the cylindrical housing portion 6, and extends downwards from the open end of the housing 2.

Figure 4:
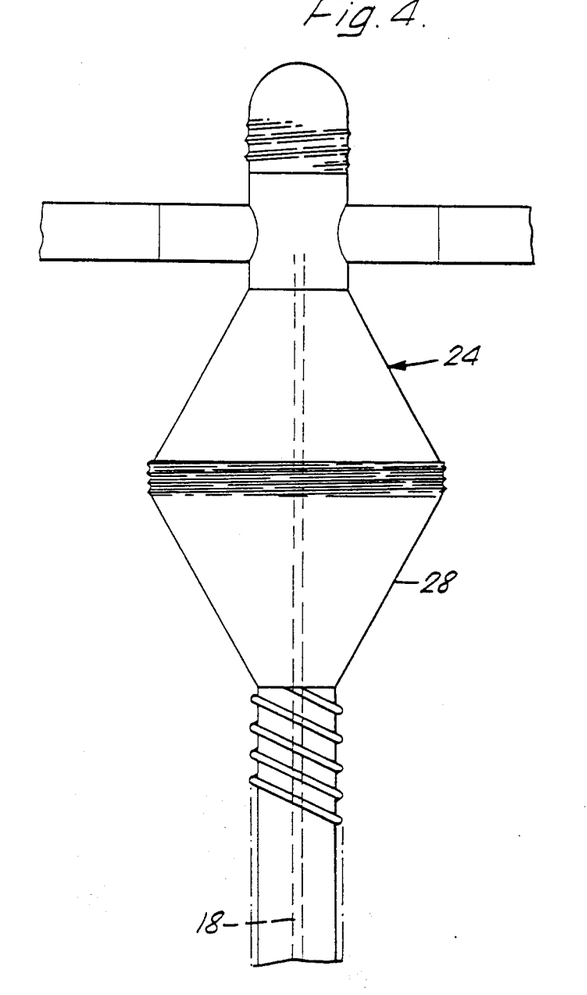

The further embodiment of the assembly shown in FIG. 4 comprises a housing 24 that differes from the housing 2 in having an external screw-thread 26 at its lower open end, to which is externally threaded one end of a convoluted tubing 28.

The protective assembly of FIG. 4 has the advantage over the protective assembly of FIG. 3 in that the housing 24 does not shield the tubing 28 from water, and thus minimises the risk of dry-band formation on the outer surface of the combination of housing and tubing, which, in the assembly of FIG. 3, could in some circumstances give rise to electrical damage to the tubing by way of tracking and erosion.

Figures 5A, 5B:
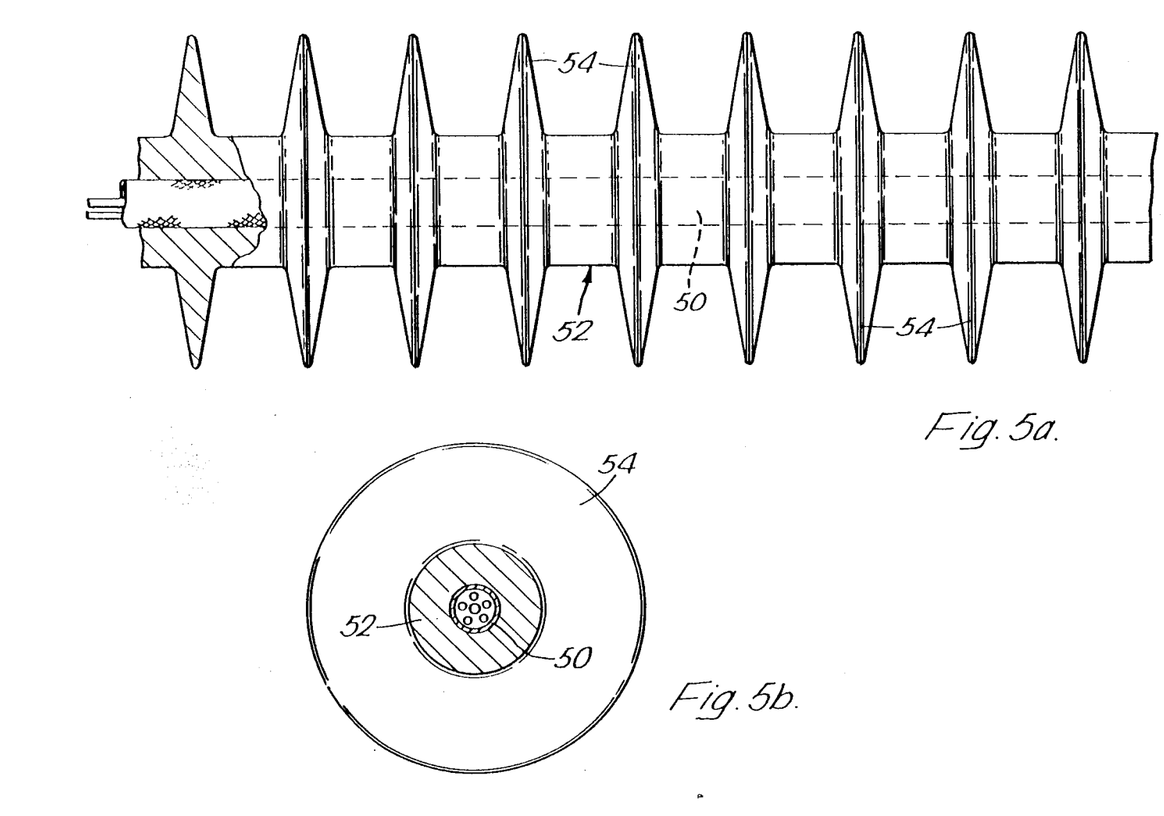
FIGS. 5a and 5b show in partly cutaway and cross-section respectively a modification of part of the assemblies of FIGS. 2,2a,3 and 4.

FIGS. 5a and 5b refer to alternative means to the convoluted tubings 22 and 28 for guiding a fibre optic cable from a high voltage area to a lower voltage area, and is particularly, though not exclusively applicable in higher voltage applications, say above 132 kV, where increased creepage path length is required. Thus, a fibre optic cable 50, which comprises five fibre optical fibres surrounding a strengthening member in a fully water-blocked construction, is embedded in a non-tracking outer jacket 52 that has sheds 54 on its outer surface.

Figures 6A, 6B:
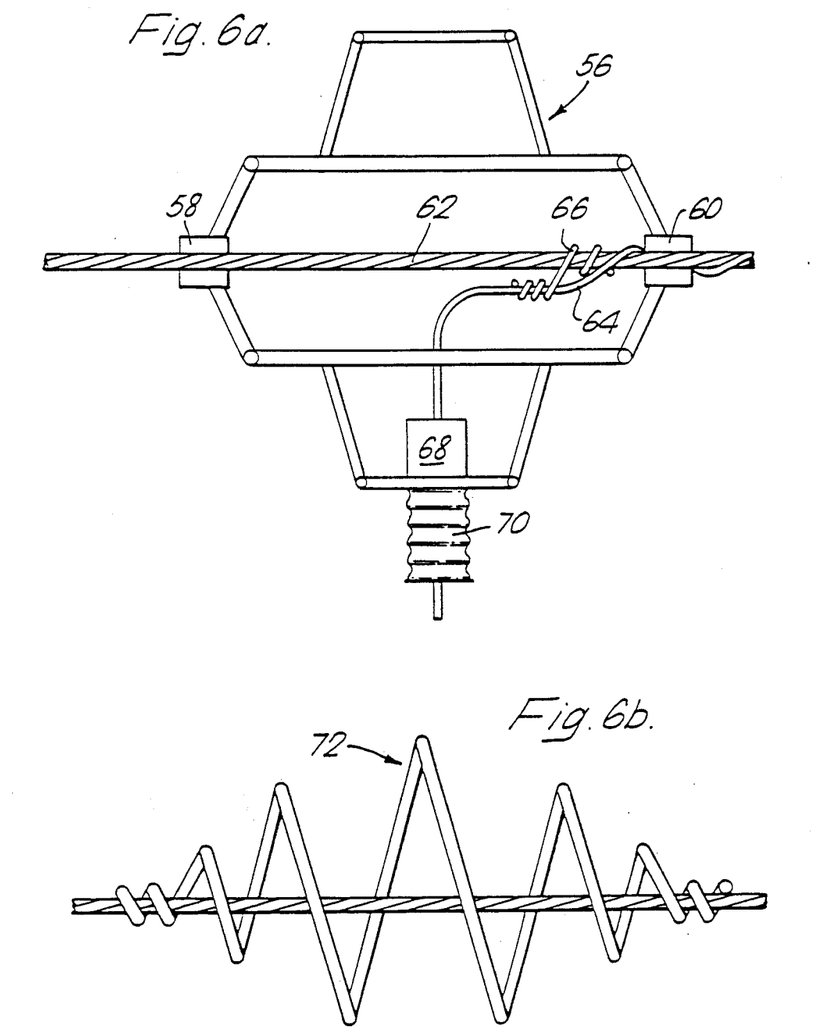
FIGS. 6a,6b and 6c are diagramatic representations of a portion of further assemblies that comprise other embodiments of the housing.
Figure 6C:
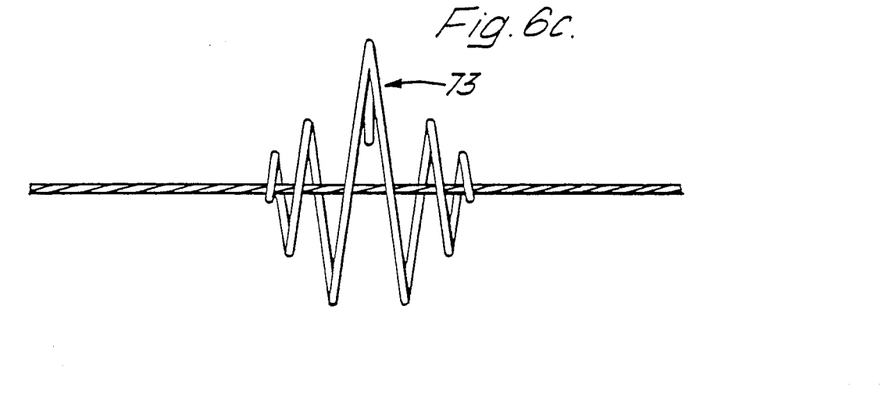

Alternative housings to housings 2,21 and 24 previously described are shown in FIGS. 6a, 6b and 6c. The housings of FIG. 6a,6b and 6c are of open helical configuration, of metal, or fairly rigid conductive polymer, provide a substantially spherical enclosure, and are mounted on the overhead high voltage conductor.

The housing 56 of FIG. 6a is coiled around a generally vertical axis, and is clamped at diametrically-opposed locations 58,60 on to the conductor 62. A fibre optic cable 64 that extends helically along the condcutor 62 is guided therefrom within the housing 56 by a coiled member 66, and passes to a cable splice enclosure, shown diagramatically at 68, that is mounted on the housing 56. After splicing within the enclosure 68, the fibre optic cable leaves the housing 56 in a convoluted and/or shedded tube 70 as previously described.

The housing 72 of FIG. 6b differs from that of FIG. 6a, in that it extends helically about an axis that is coincident with the overhead conductor. The detachment, splicing and subsequent guiding of the fibre optic cable is not shown, but may conveniently be as previously described.

It will be appreciated that each of the enclosures 56 and 72 of FIGS. 6a and 6b usually have to be mounted on to the overhead conductor without it having to be cut; that is to say, they will have to be attached from the side rather than be slid on from an end of the conductor. The inherent rigidity required of these open configuration housings may make this rather difficult in some instances. The housing 73 of FIG. 6c overcomes this difficulty, since it is formed from a metal or fairly rigid conductive polymeric tubular member that is secured at its mid point, put into a U-shape and then wound about a mandrel such that the limbs of the U extend axially in opposite directions. The housing 73 is mounted on the conductor by looping the mid point thereover and subsequently rotating the entire housing about the conductor until gripping engagement is achieved at each end of the housing.

Figure 7:
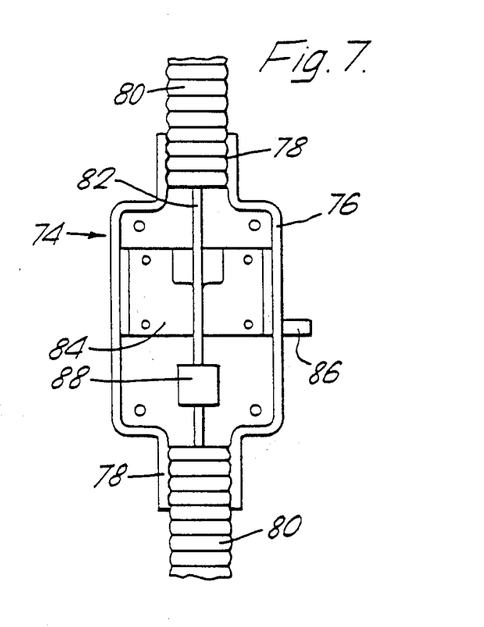
FIG. 7 is a vertical section through another housing that is suitable for effecting ground connection of the fibre optic cable.

FIG. 7 shows a housing 74 that is suitable for attachment to the convoluted tubing that guides the fibre optic cable from the overhead conductor to its station at earth potential and serves as a stress control arrangement, an earthing medium and earth leakage current collector. It may also serve as an enclosure for a fibre optic splice or connector.

The housing 74, shown open in FIG. 7, comprises two generally semi-cylindrical brass half-shells 76 each of which has an integrally-ridged neck portion 78 at each end for gripping the convoluted tubing 80 that guides the fibre optic cable 82. A further pair of generally semi-sylindrical brass half-shells 84 are located within the housing 74 and are clamped in contact with the half-shells 76 on closure of the housing. The non-tracking convoluted tubing 80 extends into the housing 74 and the fibre optic cable 82 exits therefrom and passes into a passageway formed by the half-shells 84. The larger upper part of the passageway encloses the fibre optic cable loosely, and is filled with a potting composition, and the narrower, lower part of the passageway grips the fibre optic cable firmly, but not so as to effect any damage thereto. Thus, the housing 74 makes direct electrical contact with the outer non-tracking tubing 80 and with the fibre optic cable 82. A conductive connecting stud 86 is mounted on the outside of one of the half-shells 76, and a conductor (not shown) extends therefrom to a point at earth potential.

The housing 74 contains a splice enclosure, shown diagrammatically at 88, and the fibre optic cable passes therefrom into a further portion of the convoluted tubing 80 for onward transmission to a decoding station.

It is to be understood that in many instances, the fibre optic cable may not need to be protected, such as by a convoluted tube, and that this may be so whether or not the high voltage stress control arrangement is applied to the cable. Thus, referring to FIG. 7, if there is no requirement for the protective insulating, non-tracking convoluted tubing 80 to protect the fibre optic cable 82, then the outer pair of half shells 76 of the earth leakage current collector 74 may be dispensed with. In this case, the half shells 84 would be directly connected to earth potential.

Figure 8:
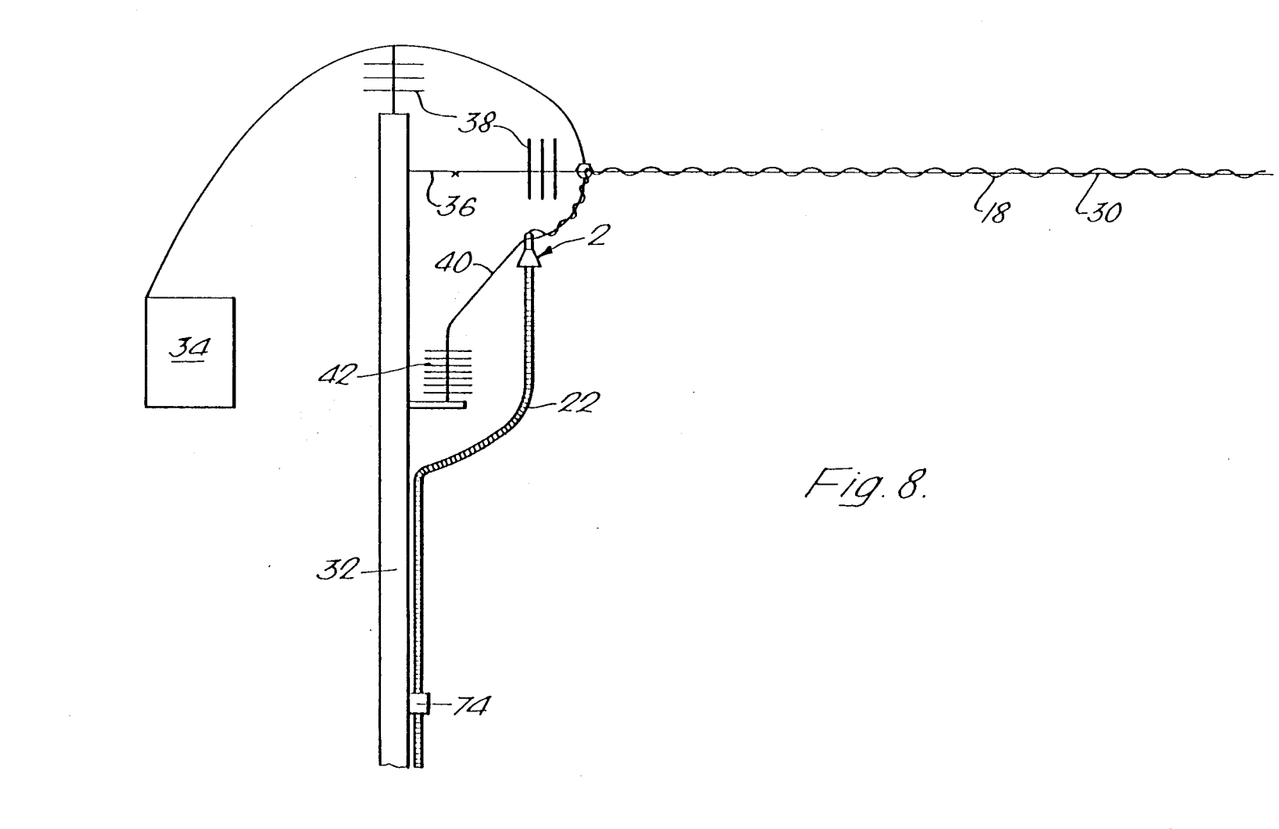
FIG. 8 is a schematic representation of the assembly of FIG. 3 positioned adjacent the termination of a high voltage conductor at a transformer station, and including the earthing housing of FIG. 7.

Referring to FIG. 8, a high voltage conductor 30 with the fibre optic cable 18 spirally round thereon extends from one switchgear/transformer station (not shown), over a ten meter high support pole 32, and thence to a terminating switchgear/transformer station 34. The conductor 30 is secured to the pole 32 by tensioners 36 and is electrically isolated therefrom by insulators 38. Just before reaching the pole 32, the fibre optic cable 18 is lead away from the main conductor 30 along a drop wire 40, that at one end is crimped on to the conductor 30 and that at its other end is connected to a surge diverter 42 and thence to the pole 32 at earth potential. Thus, the drop wire 40 is at the same voltage, 33 kV say, as the conductor 30. The fibre optic cable 18 is taken off the drop wire 40 in advance of the surge diverter 42 via the electrically-conductive housing 2 or 21, and thence through the insulated convoluted tubing 22 that is secured to the pole 32. At the bottom end of the pole the fibre optic cable 18 leaves the conductive tubing 22 and enters into switchgear (not shown), which is at earth potential. This occurs after the cable and tubing has been earthed, for example as shown by means of the housing 74.

It will be appreciated that usually the conductor 30 will be accompanied by two other conductors, thus providing a three-phase power supply, but only one of the conductors will, in general be required to carry a fibre optic cable.

It is to be understood that features of fibre optic cables and cable arrangements mentioned herein may be combined together in any suitable combination to achieve particular objects.

We claim:

1. A fibre optic cable suitable for extending between a region of high electric potential and a region of appreciably lower potential, wherein in the high potential region the cable has an outer jacket of electrically conductive material, and wherein in the lower potential region the cable has an outer jacket of substantially electrically non-tracking material.

2. An assembly comprising:
   a high voltage electric conductor;
   a fibre optic cable mounted on or outside of the electric conductor so as to be subject to an electric field thereof;
   an electrically conductive housing mounted on the electric conductor, the housing extending away from the conductor and conducting said fibre optic cable away from the electric field of the conductor;
   an electrically insulated tubular member having a convoluted or shedded outer surface and containing a filler medium conducting said fibre optic cable from said housing to a region at a ground potential;
   a pair of metal half-shells clamped together around said tubular member and arranged to be connected to ground potential at said region; and
   said fibre optic cable being electrically connected to an inside of said half-shells.

3. An assembly according to claim 2, wherein the fibre optic cable is helically wrapped around the conductor.

4. An assembly according to claim 2 wherein the fibre optic cable extends between a region of high electric potential and a region of appreciably lower potential, and wherein a portion of the fibre optic cable which is in the high potential region is an outer jacket of electrically conductive material, and wherein the portion of the cable in the lower potential region has an outer jacket of substantially electrically non-tracking material.

* * * * *